US010392100B2

(12) United States Patent
Jezewski et al.

(10) Patent No.: US 10,392,100 B2
(45) Date of Patent: Aug. 27, 2019

(54) MECHANICAL LOAD LIMITING AND ELECTRICAL LOAD SENSING DEVICE AND SYSTEM

(71) Applicant: EATON CORPORATION, Cleveland, OH (US)

(72) Inventors: Christopher James Jezewski, Coopersville, MI (US); Thomas James Fields, Grand Rapids, MI (US); Tyler Quincey Curtis, Rockford, MI (US); Sorin Gavriliuc, Caledonia, MI (US)

(73) Assignee: Eaton Intelligent Power Limited, Dublin (IE)

( * ) Notice: Subject to any disclaimer, the term of this patent is extended or adjusted under 35 U.S.C. 154(b) by 307 days.

(21) Appl. No.: 15/355,272

(22) Filed: Nov. 18, 2016

(65) Prior Publication Data

US 2017/0144775 A1 May 25, 2017

Related U.S. Application Data

(60) Provisional application No. 62/258,036, filed on Nov. 20, 2015.

(51) Int. Cl.
*G01L 1/00* (2006.01)
*B64C 13/50* (2006.01)
*G01L 1/12* (2006.01)
*G01L 1/04* (2006.01)
*B64C 13/28* (2006.01)

(52) U.S. Cl.
CPC ............. *B64C 13/50* (2013.01); *B64C 13/28* (2013.01); *G01L 1/042* (2013.01); *G01L 1/122* (2013.01)

(58) Field of Classification Search
CPC ..... B64D 45/0005; B64C 13/50; B64C 13/28; G01L 1/042; G01L 1/122
USPC ........................................................... 73/802
See application file for complete search history.

(56) References Cited

U.S. PATENT DOCUMENTS

| 5,902,964 | A | * | 5/1999 | Solberg, Jr. | .............. G01G 3/16 177/1 |
| 6,209,825 | B1 | * | 4/2001 | Scott | ........................ B64C 13/40 244/226 |
| 9,458,906 | B2 | * | 10/2016 | Bianchi | ................... F16F 9/065 |
| 2003/0156948 | A1 | * | 8/2003 | Malmquist | .............. B64C 13/40 417/111 |
| 2010/0181152 | A1 | * | 7/2010 | Anderson | ............. B60T 8/4086 188/152 |

* cited by examiner

*Primary Examiner* — Max H Noori
*Assistant Examiner* — Masoud H Noori
(74) *Attorney, Agent, or Firm* — Fishman Stewart PLLC (57) ABSTRACT

A device and system for monitoring a load or applied force includes a body having first and second ends, a plate, a force-providing member connected to the plate, a first biasing member, and a first sensor. In embodiments the first biasing member is disposed between a portion of the body at or about the first end and a portion of the plate, and is configured to substantially retain the plate in an initial position during normal operation of the device; the first sensor is configured to sense a displacement (e.g., displacement position) with respect to the plate; and the body includes a portion configured to connect to or apply a force to another component. A controller may selectively instruct and/or operate a component, such as a motor, in response to an output generated or provided by the sensor. If an excessive force is sensed, the device may mitigate resulting damage.

21 Claims, 4 Drawing Sheets

MECHANICAL LOAD LIMITING AND ELECTRICAL LOAD SENSING DEVICE AND SYSTEM

CROSS-REFERENCE TO RELATED APPLICATION

This application claims the benefit of U.S. Provisional Application Ser. No. 62/258,036, filed Nov. 20, 2015, the disclosure of which is hereby incorporated herein by reference in its entirety.

TECHNICAL FIELD

The present disclosure relates to devices and systems for sensing and limiting loads, including devices and systems for mechanical load limiting and electrical load sensing.

BACKGROUND

Various mechanical actuators, such as, by way of non-limiting example, mechanical actuators employed to expand and retract a wing flap associated with an aircraft, typically join a fixed member to an adjustable and/or movable member. The mechanical actuators may actuate in response to various forces being applied to the mechanical actuator. By way of non-limiting example, a controller may selectively control a motor that applies a predetermined force that drives a component of the mechanical actuator in response to a signal received from the controller.

The component driven by the motor may be configured such that, when driven in one direction, the mechanical actuator may actuate in a first direction. Conversely, the component driven by the motor may be configured, such that, when driven in another direction, the mechanical actuator may actuate in a second direction. By way of non-limiting example, a mechanical actuator may be configured to expand and retract a wing flap of an aircraft. The wing flap may expand when the mechanical actuator is actuated in the first direction. Conversely, the wing flap may retract when the mechanical actuator is actuated in the second direction.

In some scenarios, a mechanical actuator may bind as a result of an unexpected force acting on the mechanical actuator. By way of non-limiting example, a wing flap associated with an aircraft may malfunction due to debris in a track associated with the wing flap and/or a sudden force, such as wind or other natural forces, being applied to the wing flap. In scenarios where the wing flap malfunctions, the force applied by the motor to the component of the mechanical actuator may suddenly increase. For example, the mechanical actuator may be prevented from actuating in the first direction when the wing flap malfunctions during expansion. Because the normal motion of the actuated device (i.e., the normal motion of the wing flap) may not occur, the force applied to the component may increase. The increase in force may cause the mechanical actuator and/or the actuated device to bind and/or become damaged. Accordingly, a system for limiting a force applied by the mechanical actuator and/or to serve as a form of mechanical fuse may be desirable.

SUMMARY

A device and system for monitoring a load or applied force includes a body having first and second ends, a plate, a force-providing member connected to the plate, a first biasing member, and a first sensor. In embodiments the first biasing member is disposed between a portion of the body at or about the first end and a portion of the plate, and is configured to substantially retain the plate in an initial position during normal operation of the device; the first sensor is configured to sense a displacement (e.g., displacement position) with respect to the plate; and the body includes a portion configured to connect to or apply a force to another component. A controller may selectively instruct and/or operate a component, such as a motor, in response to an output generated or provided by the sensor. If an excessive force is sensed, the device may mitigate resulting damage.

DETAILED DESCRIPTION

Various mechanical actuators may be employed to actuate various devices, assemblies, machines, and/or components. By way of non-limiting example, mechanical actuators may be employed to actuate components of an aircraft, a passenger car and/or truck, commercial vehicles, door lifts, platforms, and/or other suitable devices, assemblies, machines, and/or components. In embodiments, a mechanical actuator may be employed to actuate various components of an aircraft, such as, by way of non-limiting example, wing flaps, cargo doors, landing gear, and/or other suitable components of the aircraft. It is understood that while the present disclosure makes use of aircraft components as examples, the principles disclosed herein apply to suitable mechanical actuators employed on other suitable systems, assemblies, vehicles, devices, and/or components.

Figure 1:
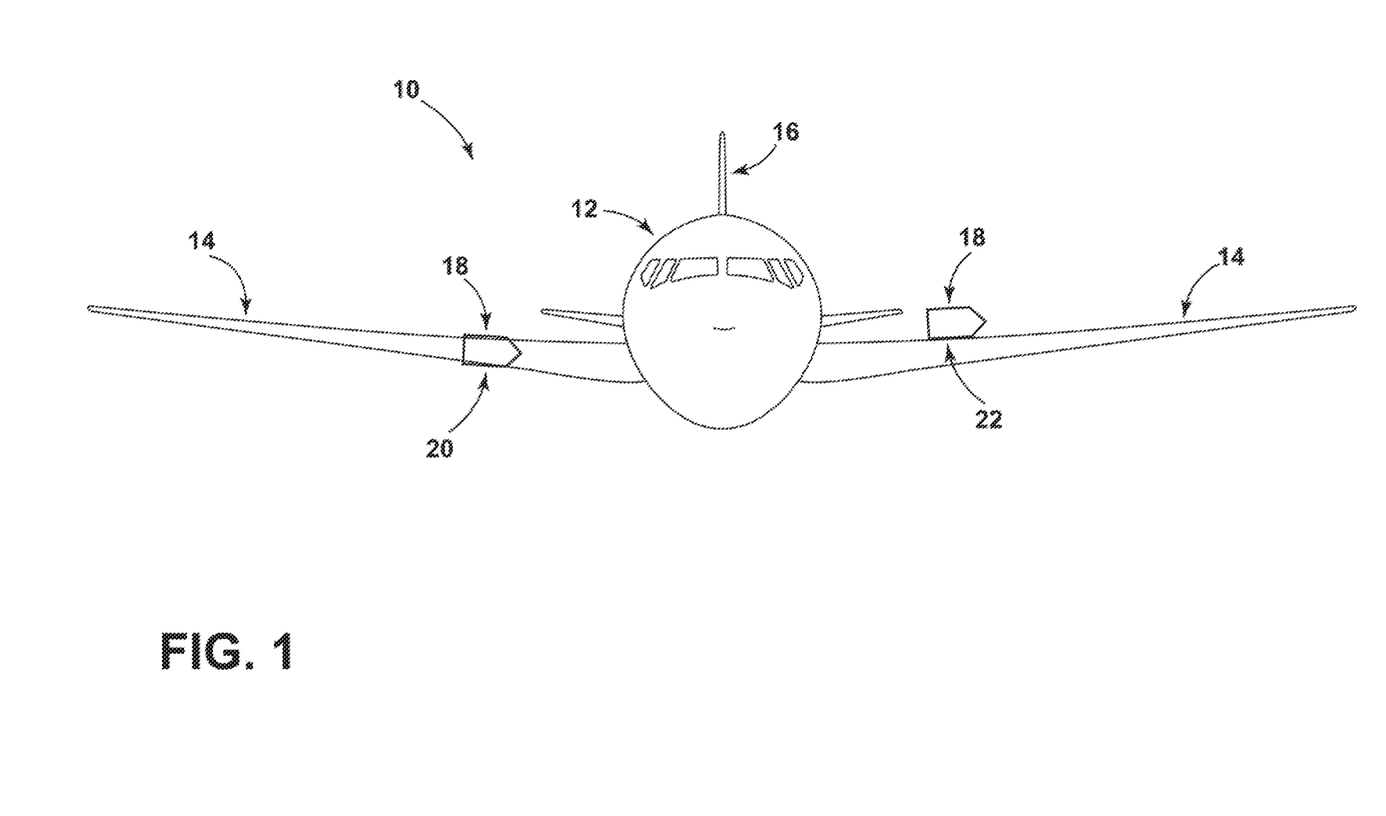
FIG. 1 generally depicts an aircraft including various wing flaps embodying principles of the present disclosure.

With reference to FIG. 1, front view of an aircraft 10 is generally illustrated. The aircraft may include a body or fuselage 12. The aircraft 10 may also include one or more wings 14 and a tailfin 16. In embodiments, each of the wings 14 may include one or more wing flaps 18. Each wing flaps 18 may be configured to alter various lift characteristics of a corresponding wing 14. By way of non-limiting example, each of the wing flaps 18 may be configured to reduce a speed at which the aircraft 10 can be flown and/or to increase an angle of descent when the aircraft 10 is landing. Each of the wing flaps 18 may be selectively expanded and/or retracted in order to increase and/or decrease wind drag experiences by the corresponding wing 14.

As generally illustrated at 20, a wing flap 18 may be actuated and/or controlled to a first or retracted position. Conversely, as generally illustrated at 22, a wing flap 18 may be actuated and/or controlled to a second or extended position. It is understood that each wing flap 18 may be actuated and/or controlled to various positions between the retracted position 20 and the expanded position 22. By way of non-limiting example, a wing flap 18 may be actuated and/or controlled to a position that is more expanded than the retracted position 20 and/or less expanded than the expanded position 22.

Figure 2:
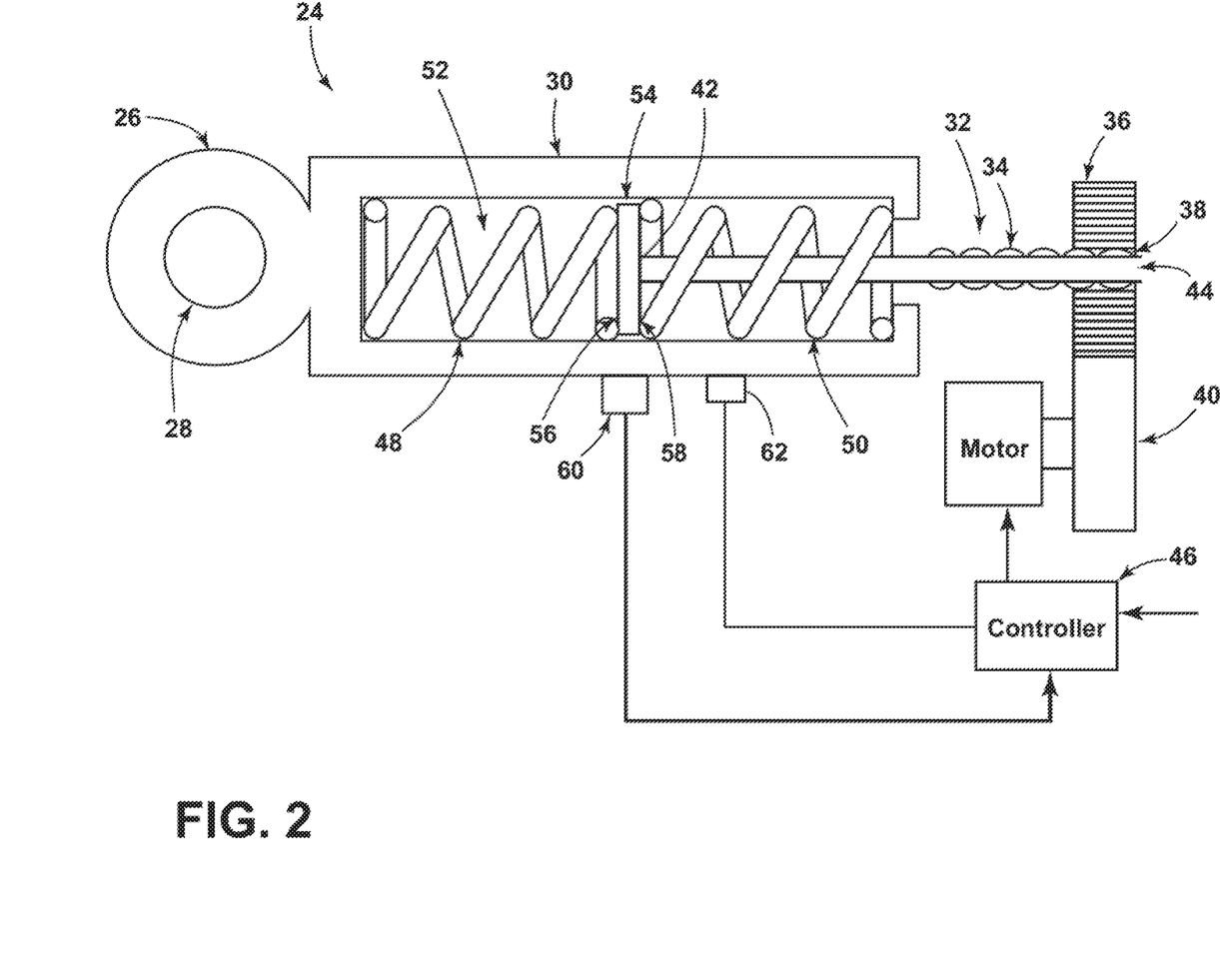
FIG. 2 generally depicts an embodiment of a mechanical load limiter embodying principles of the present disclosure.

In embodiments, each wing flap 18 may be actuated and/or controlled by a mechanical actuator, such as, by way of non-limiting example, mechanical actuator 24 as generally illustrated in FIG. 2. The actuator 24 may be configured to expand and retract a corresponding wing flap 18. The actuator 24 may include a pin hole or end effector 26. The end effector 26 may include an aperture 28. The aperture 28 may be configured to receive a connector or a pin (hereinafter, referred to as a "pin"). The pin may be configured to connect or fix the end effector 26 to an associated wing flap 18. In some embodiments, the end effector 26 may be connected or fixed via a pin to a corresponding wing 14. That is, the end effector 26 may be connected or fixed to an adjustable component, such as, by way of non-limiting example, a wing flap 18, or be connected or fixed to a component that is stationary relative to the actuator 24, such as, by way of non-limiting example, a corresponding wing 14.

The actuator 24 may include a body 30 and a rod 32, which may be a lead screw 32, such as referred to hereinafter. The lead screw 32 may comprise a plurality of threads 34. The plurality of threads 34 may be configured to mechanically communicate with a thread-related component or nut (hereinafter, referred to as a "nut"). By way of non-limiting example, a nut 36 may comprise a plurality of threads 38 disposed on an inner surface of the nut 36. The threads 38 and the threads 34 may be configured to cooperatively operate in order to move the nut 36 along the lead screw 32.

In embodiments, the nut 36 may be in mechanical or operative communication with a motor 40. By way of non-limiting example, the nut 36 may be configured to be driven by the motor 40. In embodiments, a plurality of gears may translate energy generated by the motor 40 to the nut 36. As will be explained in detail below, the motor 40 may be selectively operated in a first direction and/or a second direction. By way of non-limiting example, when the motor 40 is operated in the first direction, the nut 36 may turn in a clockwise direction. Conversely, when the motor 40 is operated in the second direction, the nut 36 may turn in an anti-clockwise direction.

In embodiments, the lead screw 32 may be fixed to a portion of the body 30 at a first end 42 of the lead screw 32. The lead screw 32 may include a second end 44. The second end 44 may be inserted into the nut 36. As the motor 40 turns the nut 36, the lead screw 32 may be threaded through the nut 36 toward and/or away from an associated wing 14. By way of non-limiting example, when the motor 40 turns in the first direction, the nut 36 may turn in a clockwise direction. When the nut 36 turns in a clockwise direction, the lead screw 32 may be drawn toward a corresponding wing 14. As the lead screw 32 is drawn toward the body 30 and the end effector 26 may be drawn in toward the corresponding wing 14. As described, the end effector 26 may be fixed to a portion of a corresponding wing flap 18. As the end effector 26 is drawn in toward the corresponding wing 14, the end effector 26 may draw a corresponding wing flap 18 toward the corresponding wing 14. That is, the corresponding wing flap 18 may be adjusted and/or retracted toward the corresponding wing 14 when the lead screw 32 is drawn in toward the corresponding wing 14.

Conversely, when the motor 40 turns in the second direction, the nut 36 may turn in an anti-clockwise direction. When the nut 36 turns in the anti-clockwise direction, the lead screw 32 may be moved and/or pushed away from the corresponding wing 14. As described, the end effector 26 may be fixed to a portion of a corresponding wing flap 18. As the lead screw 32 is moved away from the corresponding wing 14, the end effector 26 may be moved away from the wing 14. Accordingly, when the end effector 26 is moved away from the wing 14, the corresponding wing flap 18 may be adjusted and/or expanded, relative to the wing 14, when the nut 36 turns in in the clockwise direction.

The motor 40 may be in electrical and/or mechanical communication with a controller 46. The controller 46 may comprise an electrical controller and/or computer comprising a processor and memory. The processor may be configured to execute instructions or code stored on the memory. By way of non-limiting example, the processor may be configured to execute motor controller code stored on the memory. It is understood that the controller 46 may be any suitable controller and/or controlling system. In embodiments, the aircraft 10 may include a plurality of control switches disposed in a cockpit of the aircraft 10. By way of non-limiting example, the plurality of control switches may include a wing flap actuator switch. The wing flap actuator switch may be engaged in order to instruct one or more wing flaps 18 to expand and/or retract.

The switch may be an on/off switch or a variable switch. By way of non-limiting example, the switch may be placed in a first position. The first position may correspond to a wing flap 18 extending. The switch may be placed in a second position. The second position may correspond to a wing flap 18 retracting. Additionally or alternatively, the switch may be placed in a plurality of positions each of which may correspond to a wing flap position between fully expanded and fully retracted.

In some embodiments, the controller 46 may receive a signal from the wing flap actuator switch. The signal may be a voltage signal or other suitable signal. The controller 46 may be configured to translate the signal. The controller 46 may be further configured to control the motor 40 based on the translated signal. By way of non-limiting example, the controller 46 may instruct the motor 40 to turn in the first direction for a first period when the signal indicates that a corresponding wing flap 18 should be fully retracted. In another example, the controller 46 may instruct the motor 40 to move in the second direction for a second period when the signal indicates that the wing flap 18 should be partially extend. It is understood that the controller 46 may control the motor 40 in either direction for various suitable periods in response to the received signal. It is understood that the controller 46 may receive instructions and/or data signals from a plurality of sources instructing the controller 46 to actuate the actuator 24.

In some scenarios, the actuator 24 may bind as a result of an unexpected force acting on the actuator 24. By way of non-limiting example, a wing flap 18 could potentially malfunction due to debris in a track associated with the wing flap 18 and/or a sudden force, such as wind or other natural forces, being applied to the wing flap 18. In scenarios where the wing flap 18 malfunctions and/or sticks in a position, the force applied by the motor 40 on the nut 36 may suddenly increase. By way of non-limiting example, the controller 46 may instruct the motor 40 to turn in the first direction. The nut 36 may turn clockwise in response to the motor turning in the first direction. The lead screw 32 may be drawn in toward an associated wing 14 in response to the nut 36 turning clockwise.

When an unexpected force acts upon an associated wing flap 18, such as described, the actuator 24 may be prevented from retracting the wing flap 18. The force applied by the motor 40 may suddenly increase with respect to the actuator 24—for example, to try to compensate with respect to the unexpected force. With such situations, for example, a flap of an aircraft may be sticking or unable to move, and in the absence of some form of control or implicated restraint, an actuator might otherwise continue to apply a load, or perhaps even an increased or increasing load. In such a situation, if an actuator was configured to instead mitigate forces that could potentially cause damage, a damaging force applied to other components, such as flight control surfaces, may be reduced or otherwise eliminated. As a potentially damaging load would therefore not be applied to the components (e.g., flight control components), harmful impact may be mitigated and/or negated.

Accordingly, the actuator 24 may include a system for limiting a mechanical load applied to the actuator 24 and/or a load sensing system configured to monitor loads applied to the actuator 24. With embodiments, the device or system may be configured, for example, to limit a load or an applied force to or below a specified or pre-determined threshold for at least some duration (e.g., minimum time period). With continued reference to FIG. 2, the actuator 24 may include a first spring 48 and a second spring 50. The first spring 48 and the second spring 50 may be disposed in a cavity 52 within the body 30. The first end 42 of the lead screw 32 may include a disc or plate 54 disposed within the body 30. The plate 54 may be disposed at an initial and/or original position within the body 30. As generally illustrated, the plate 54 may be disposed at or near a center of the body 30. However, it is understood that the plate 54 may be initially and/or originally disposed in other suitable positions or configurations within the body 30.

In embodiments, the first spring 48 may be disposed between the end effector 26 and a first side 56 of the plate 54. The second spring 50 may be disposed between the nut 36 and a second side 58 of the plate 54. As generally illustrated, the first spring 48 and the second spring 50 may be disposed generally equally on either of the first side 56 and the second side 58. However, it is understood, the first spring 48 and the second spring 50 may be disposed and/or distributed in other suitable proportions within the body 30.

In embodiments, the first spring 48 may comprise a first spring compression and the second spring 50 may comprise a second spring compression. The first spring compression and the second spring compression may be set and/or selected to be equal to slightly less than a maximum amount of force than the actuator 24 can absorb without being damaged and/or without damage occurring to associated components of the aircraft 10 (i.e., the wing flap 18). Under normal conditions (i.e., by way of non-limiting example, an associated wing flap 18 extends and retracts without binding, sticking, and/or being damaged), the first and second spring compression forces may be set to ensure that the first spring 48 and the second spring 50 do not move and/or compress. That is, the plate 54 maintains a position when the actuator 24 actuates according to its design.

At least one of the first spring 48 and the second spring 50 may compress in response to a force applied to the actuator 24 exceeding the value of the first and second spring compressions. For example, as described, a force applied to the actuator 24 may suddenly increase in response to a corresponding with flap 18 being bound, stuck, or damaged. The sudden increase in force applied to the actuator 24 may damage the actuator 24 and/or components being actuated by the actuator 24 (i.e., a wing flap 18 and/or an associated wing 14). However, in embodiments that include the first spring 48 and the second spring 50, the first spring 48 and the second spring 50 may absorb at least a portion of the suddenly increased force applied to the actuator 24. In this manner, the time between the force applied to the actuator 24 suddenly increasing and the actuator 24 and/or associated components being actuated sustaining damage may be extended due to the first spring 48 and the second spring 50 absorbing at least a portion of the suddenly increased force.

In embodiments, the time between the force being increased on the actuator 24 and the actuator 24 and/or associated components being actuated sustaining damage being extended may allow the controller 46 to instruct the motor 40 to stop turning, thereby removing the force applied to the actuator 24, which in turn may prevent damage to the actuator 24. As will be explained in detail below, the controller 46 may receive feedback from a sensor configured to monitor a portion of the actuator 24. The feedback received by the controller 46 may indicate that the force applied to the actuator 24 has suddenly increased.

By way of non-limiting example, as the force applied to the actuator 24 increases, the amount of force may approach, or even exceed, the value of the first and second spring compressions. When the amount of force applied to the actuator 24 exceeds the value of the first and second spring compressions, one of the first spring 48 and the second spring 50 may compress. When the one of the first spring 48 and the second spring 50 compresses, the one of the first spring 48 and the second spring 50 absorbs at least a portion of the force applied to the actuator 24. In this way, damage to a component, such as a structure controlled or actuated by an actuator 24, may be delayed and/or avoided. That is, at least one of the first spring 48 and the second spring 50 may compress before the actuator 24 sustains damage.

In embodiments, the first spring 48 may compress when the actuator 24 is expanding a corresponding wing flap 18 and a force applied to the actuator 24 in order to expand the wing flap 18 suddenly increases. Additionally, the second spring 50 may expand when the first spring 48 compresses. Conversely, the second spring 50 may compress when the actuator 24 is retracting the corresponding wing flap 18 and a force applied to the actuator 24 in order to retract the wing flap 18 suddenly increases. Additionally, the first spring 48 may expand when the second spring 50 compresses. In this manner, as one of the first spring 48 and the second spring 50 compresses, the other of the first spring 48 and the second spring 50 expands. Accordingly, the plate 54 may be displaced from an initial position with in the body 30.

The force applied to the actuator 24 may continue to increase. The force applied to the actuator 24 may substantially exceed the value of the first and second spring compressions which may result in damage to the actuator 24 and/or associated components being actuated. By way of non-limiting example, a force may be applied to the actuator 24 in order to expand a corresponding wing flap 18. The corresponding wing flap 18 may become bound and/or stuck due to, by way of non-limiting example, debris in a track associated with the wing flap 18. The force applied to the actuator 24 may suddenly increase. Accordingly, as described, the plate 54 may be displaced from an initial position (i.e., because the actuator 24 is expanding the wing flap 18, the plate 54 may be displaced from an initial position and become biased toward the end effector 26). As described, the first spring 48 may compress, thereby absorbing at least a portion of the increased force applied to the actuator 24. As the force applied to the actuator 24 continues to increase, the force may exceed the first spring compression, as described. In embodiments, the actuator 24 may be configured to determine whether the plate 54 has been displaced from an initial position and may communicate a value indicating the displacement to the controller 46.

As generally illustrated in FIG. 2, the actuator 24 may include a sensor 60. The sensor 60 may be disposed on a portion of the body 30. By way of non-limiting example, the sensor 60 may be disposed on an exterior surface of the body 30. As generally illustrated, the sensor 60 may be disposed on a lower portion of the body 30. It is understood, however, that the sensor 60 may be disposed in other suitable locations. In embodiments, the sensor 60 may comprise a hall effect sensor or other suitable sensor.

The sensor 60 may be configured to sense a displacement in position of the plate 54 (i.e., a change in a gap and/or distance between the plate 54 and the sensor 60). In embodiments, the plate 54 may comprise a magnetic portion. Additionally or alternatively, the plate 54 may include one or more magnets disposed on a portion of the plate 54. The sensor 60 may be sensitive to the magnetic portion of the plate 54. By way of non-limiting example, the sensor 60 may comprise a hall effect sensor. Alternatively, the sensor 60 may comprise a hall effect switch. The sensor 60 may generate a voltage output signal. The voltage output signal may be indicative of a position of the plate 54 relative to the sensor 60. For example, the sensor 60 may vary a value of the voltage output signal in response to a magnetic field generated by the magnetic portion of the plate 54. A value associated with the magnetic field may change as a gap and/or distance between the plate 54 and the sensor 60 changes. By way of non-limiting example, the plate 54 may be disposed within the body 30 at an initial position.

As illustrated, an initial position may be substantially directly above the sensor 60. The sensor 60 may be configured to generate a first voltage output signal. A value of the first voltage output signal may correspond to an initial position of the plate 54. That is, the sensor 60 may be configured to associate a particular gap and/or distance between the sensor 60 and the plate 54 as an initial position of the plate 54. It is understood that while the plate 54 is illustrated as being initially disposed substantially directly above the sensor 60, the sensor 60 may be configured to correlate other suitable positions of the plate 54 with the first voltage output signal. That is, the plate 54 may be initially disposed in a position other than substantially directly above the sensor 60 and, accordingly, the sensor 60 may be configured to correlate the other position as an initial position.

As described, a magnetic value may be associated with a magnetic field generated by the plate 54. By way of non-limiting example, when the plate 54 is in an initial position, the plate 54 may generate a magnetic field comprising an initial magnetic value. The sensor 60 may generate a first voltage output signal based on the initial magnetic value. In embodiments, the sensor 60 may be configured to output a peak voltage value when the plate 54 is disposed in an initial position. In other embodiments, the sensor 60 may be configured to output a voltage value that is offset from the peak voltage. In embodiments, the sensor 60 may be configured to output a predetermined voltage value corresponding to the initial magnetic value As described, one of the first spring 48 and the second spring 50 may compress in response to a force being applied to the actuator 24 suddenly increasing. The plate 54, as described, may be displaced from an initial position when one of the first spring 48 and the second spring 50 compress. Accordingly, a gap and/or distance between the plate 54 and the sensor 60 may increase. The sensor 60 may be configured to vary the voltage output signal in response to a change in position of the plate 54. By way of non-limiting example, the sensor 60 may be configured to decrease the voltage output signal when the plate 54 is displaced from an initial position. In embodiments, the sensor 60 may be configured to continue to decrease the value of the voltage output signal as the gap and/or distance between the plate 54 and the sensor 60 continues to increase. By way of non-limiting example, the sensor 60 may continuously generate a voltage output signal. The sensor 60 may be configured to continuously communicate a value of a voltage output signal to a controller 46. In other examples, the sensor 60 may be configured to periodically communicate a value of a voltage output signal to the controller 46.

In embodiments, and as described, when the plate 54 is in an initial position, the sensor 60 may generate a first voltage output signal. The first voltage output signal may comprise a corresponding first value. As the plate 54 is displaced from an initial position, the sensor 60 may generate a second voltage output signal. The second voltage output signal may comprise a second value. The second value may be less than the first value. The sensor 60 may continue to decrease values associated with the voltage output signal as the plate 54 continues to move away from an initial position. It is understood that while the sensor 60 may be described as being configured to decrease a value associated with the voltage output signal in response to the plate 54 moving away from an initial position, the sensor 60 may instead be configured to increase a voltage value associated with the voltage output signal. It is noted that in embodiments where the sensor 60 is configured to increase a value associated with the voltage output signal, the sensor 60 may be configured to output a value that is less than a peak voltage value when the plate 54 is in an initial position.

As described, the controller 46 may be configured to receive a plurality of values associated with the voltage output signals generated by the sensor 60. The controller 46 may be configured to determine a value corresponding to a displacement of the plate 54 from an initial position based on a related voltage output value. By way of non-limiting example, the controller 46 may be configured to determine the plate 54 is in an initial position in response to receiving the first voltage output signal (i.e., the voltage output signal corresponding to the plate 54 being in an initial position). The controller 46 may be configured to continuously receive values associated with a voltage output signal. In other embodiments, the controller 46 may be configured to periodically receive values associated with a voltage output signal.

The controller 46 may be configured to monitor the values associated with the voltage output signal. In embodiments, the controller 46 may be configured to determine if the plate 54 has moved from an initial position. Additionally, the controller 46 may be configured to determine a gap between the plate 54 and the sensor 60. The controller 46 may be configured to determine an amount of force being applied to the actuator 24 based on a gap between the plate and the sensor 60. It is understood that the controller 46 may determine various characteristics of the actuator 24 based on the values received from the sensor 60.

The controller 46 may be configured to selectively control the motor 40 in response to values associated with a voltage output signal. By way of non-limiting example, the controller 46 may receive a signal from the wing flap switch, as described. The controller 46 may instruct the motor 40 to turn in response to the signal. For example, the controller 46 may determine that an associated wing flap 18 may be expanded based on a signal received from the wing flap switch. The controller 46 may instruct the motor 40 to turn in the second direction. The controller 46 may also instruct the motor 40 to turn at a predetermined rate. The predetermined rate may correspond to a motor rate that generates a desired force on a nut 36. The desired force may correspond to a force required to turn the nut 36, such that, the wing flap 18 expands.

The controller 46 may monitor values received from the sensor 60 while the wing flap 18 is being actuated by the actuator 24. The controller 46 may compare the plurality of voltage values received from the sensor 60 with a first voltage value (i.e., the peak voltage value). The controller 46, in response to one or more of the received values, may instruct the motor 40 to reduce the rate at which the motor 40 is turning and/or instruct the motor 40 to stop turning. By way of non-limiting example, the controller 46 may receive one or more values from the sensor 60. The one or more values may indicate that the force being applied to the actuator 24 is increasing. For example, the controller 46 may receive a value that is different than a first value (i.e., a lower or higher voltage output value). The controller 46 may instruct a motor 40, such as described, in order to prevent damage to the actuator 24 and/or associated components being actuated. In some embodiments, the controller 46 may compare a received value to a threshold value. The controller 46 may instruct the motor 40, as described, when the received value exceeds a threshold value. Conversely, the controller 46 may continue to monitor the values received from the sensor 60 when the received value does not exceed a threshold value.

In embodiments, the controller 46 may generate an alarm signal. The controller 46 may communicate the alarm signal to an alarm and/or indicator disposed in the cockpit of the aircraft 10. In some examples, the alarm signal may serve as a warning that damage may occur to the actuator 24 and/or the components being actuated. An operator may manually adjust and/or stop movement of the actuator 24 in response to the alarm.

In embodiments, the controller 46 may be configured to monitor a working condition of each of the first spring 48 and the second spring 50. By way of non-limiting example, over time, one or both of the first spring 48 and the second spring 50 may decay and/or become weak due to use, wear, or other unsuitable conditions. That is, the first spring compression and the second spring compression may change over time. Because the first and second spring compressions may be selected and/or configured to hold the plate 54 in an initial position under normal working conditions, as described, when/if the first and/or second spring compression changes, the plate 54 may, accordingly, move from an initial position. The controller 46 may be configured to compare the values received from the sensor 60 with a predetermined tolerance. By way of non-limiting example, the controller 46 may receive a value that is different from the first value, as described. The controller 46 may compare a difference between the value and the first value with a tolerance value.

By way of non-limiting example, the tolerance value may be a value that is +/−0.01 volts. However, it is understood, the controller 46 may be configured to compare the difference between the value and the first value with any predetermined tolerance value. When the controller 46 determines the difference between the value and the first value is within the tolerance value, the controller 46 may generate a maintenance signal. The maintenance signal may be communicated to a maintenance indicator disposed in the cockpit. An operator may schedule maintenance on the first spring 48 and/or the second spring 50 in response to the maintenance indicator.

Figure 3:
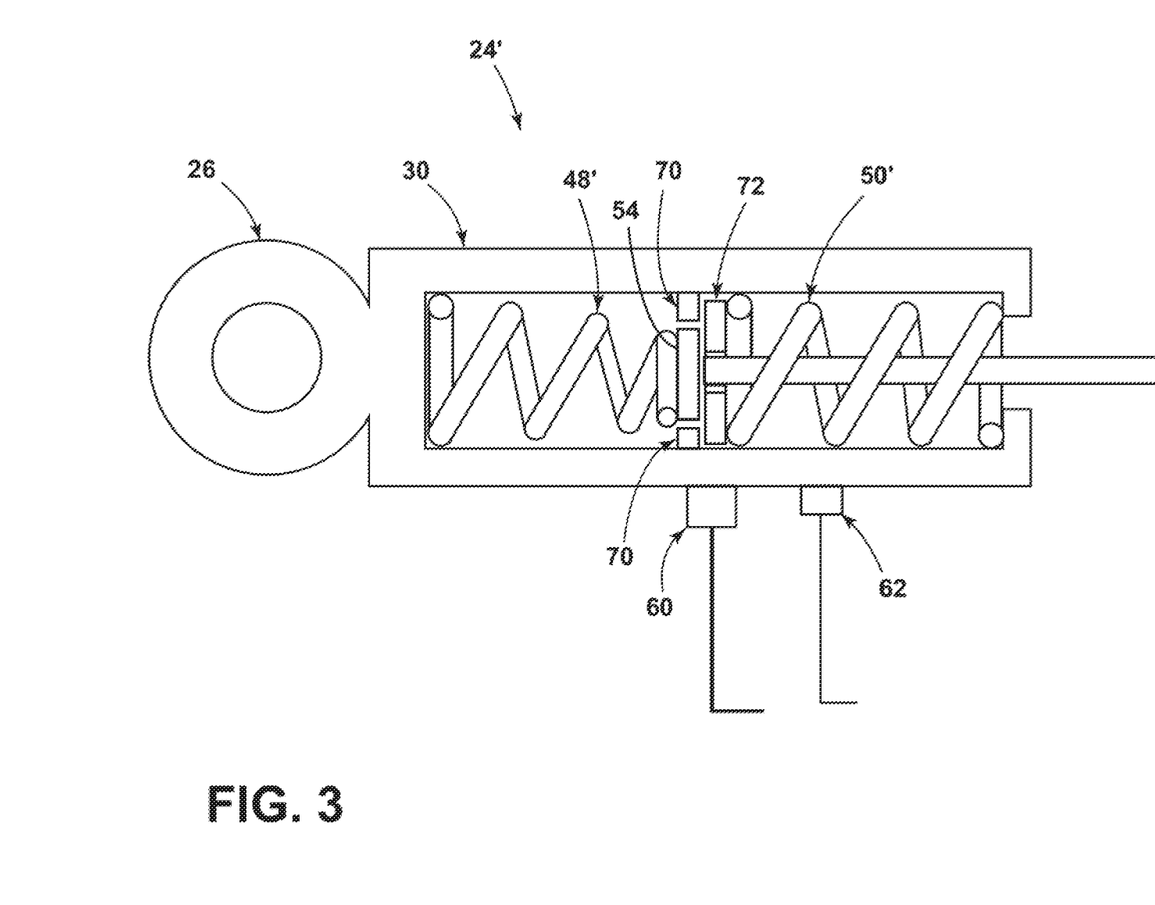
FIG. 3 generally depicts another embodiment of a mechanical load limiter embodying principles of the present disclosure.

In embodiments, the controller 46 may be configured to determine which of the first spring 48 and the second spring 50 is compressed. In embodiments, the actuator 24 may include more than one sensor. As generally illustrated in FIGS. 2 and 3, the actuator 24 may include a second sensor 62. However, the principles of the present disclosure contemplate embodiments with any suitable number and types of sensors. The second sensor 62 may comprise characteristics similar to those described with respect to the sensor 60. Similar to the sensor 60, the sensor 62 may be disposed on the body 30. While the sensor 62 is illustrated as being disposed on the lower portion of the body 30, the sensor 62 may be disposed in other suitable locations on and/or in the body 30. The sensor 62 may continuously communicate voltage output values to the controller 46. In other embodiments, the sensor 62 may be configured to periodically communicate voltage output values to the controller 46.

As described, the sensor 60 may be configured to output a first voltage output signal. The first output signal may correspond to an initial position of the plate 54. The first output signal may comprise a corresponding first value. As described, the first value may correspond to a peak output voltage. In embodiments, and as described, the first value may correspond to a value that is offset from the peak output voltage. In embodiments, the sensor 60 may be configured to generate a first value that corresponds to the peak voltage value. The sensor 62 may be configured to generate a second voltage output. The second voltage output may comprise a second value. The second value may comprise a value that is offset from the peak voltage. By way of non-limiting example, the second value may be a higher or lower value than the peak voltage value. The second value may indicate that the plate 54 is in the initial position.

Each of the sensors 60 and 62 may be configured to vary voltage output values in response to the plate 54 being displaced from an initial position. As described, the sensor 60 may decrease voltage output values in response to the gap and/or distance between the plate 54 and the sensor 60 increasing. In embodiments, the sensor 60 may decrease voltage output values as the plate 54 moves in either direction away from an initial position. Similarly, the sensor 62 may be configured to decrease voltage output values in response as the plate 54 moves in either direction away from an initial position.

The controller 46 may be configured to receive a plurality of values corresponding to voltage output values from each of the sensors 60 and 62. The controller 46 may be configured to compare a voltage value received from the sensor 60 with the first value and to compare a voltage value received from the sensor 62 with the second value. When the controller 46 determines a value received from the sensor 60 is equal to the first value and the controller 46 determines the value received from the sensor 62 is equal to the second value, the controller 46 may determine the plate 54 is in an initial position. The controller 46 may determine the plate 54 has moved from an initial position when the controller 46 determines the value received from the sensor 60 is not equal to the first value and/or the value received from the sensor 62 is not equal to the second value.

The controller 46 may control and/or instruct the motor 40, as described, to prevent damage to the actuator 24. It is understood that the controller 46 may compare the values received from the sensors 60 and 62 with various threshold values, e.g., as described, and instruct the motor 40 (by way of non-limiting example, to prevent damage to the actuator 24) in response to the comparison. In embodiments, the controller 46 may be configured to instruct the motor 40 in response to one or more received values exceeding a predetermined threshold.

In embodiments, the controller 46 may be configured to determine whether the first spring 48 or the second spring 50 is compressed. As described, one of the first spring 48 and the second spring 50 may compress when a force applied to the actuator 24 suddenly increases. As described, the sensor 60 may decrease a voltage output value as the gap between the plate 54 and the sensor 60 increases. Similarly, the sensor 62 may decrease a voltage output value as a gap and/or distance between the plate 54 and the sensor 62 increases. In embodiments, and as generally illustrated in FIG. 2 or 3, when the plate 54 is in an initial position, a gap between the plate 54 and the sensor 60 may be smaller than a gap between the plate 54 and the sensor 62. When the first spring 48 is compressed, the plate 54 may move generally toward the end effector 26. The sensor 60 may generate a voltage value that indicates the plate 54 has moved from an initial position (i.e., the sensor 60 decreases the voltage output value). Similarly, the sensor 62 may decrease a voltage output value.

The controller 46 may receive a value from the sensor 60 and a value from the sensor 62. The controller 46 may compare the value received from the sensor 60 with the first value. The controller 46 may determine a how large the gap between the plate 54 and the sensor 60 is in response to the comparison between the received value and the first value. The controller 46 may compare the value received from the sensor 62 with the second value. The controller 46 may determine how large a gap between the plate 54 and the sensor 62 is, or should be, based on the comparison between the received value and the second value. The controller 46 may compare the gap between the plate 54 and the sensor 60 to the gap between the plate 54 and the sensor 62. The controller 46 may determine the first spring 48 is compressed when the gap between the plate 54 and the sensor 62 is larger than the gap between the plate 54 and the sensor 60. Conversely, the controller 46 may determine the second spring 50 is compressed when the gap between the plate 54 and the sensor 60 is larger than the gap between the plate 54 and the sensor 62. The controller 46 may then control and/or instruct the motor 40, such as described. It is noted that the principles described with respect to the controller 46 above also apply to an embodiment that includes more than one sensor.

With particular reference to FIG. 3, another embodiment of an actuator 24' is generally illustrated. The actuator 24' may include features similar to those described with respect to the actuator 24. By way of non-limiting example, the actuator 24' may include an end effector 26, a body 30, a rod 32, which may be a lead screw 32 such as referred to hereinafter, a plate 54, and at least one of the sensors 60 and 62. The actuator 24' may be driven by a motor 40. The motor 40 may be controlled by the controller 46. The at least one sensor 60 and 62 may communicate voltage output values to the controller 46. In embodiments, the actuator 24' may include a first spring 48' and a second spring 50'. As described, the first spring 48, 48' and the second spring 50, 50', as generally illustrated in FIGS. 2 and 3, may comprise a compression strength and/or spring compression. The first spring 48 and the second spring 50 may have relatively equal spring compressions (i.e., the first and second spring compressions are substantially the same). The first and second spring may be selected in order to dispose the plate 54 in an initial position during normal operation of the actuator 24, as described with respect to FIG. 2. Normal operation of a device or component with a system may be within an anticipated, intended, or acceptable set operational parameters for the components (e.g., a normal working range). In embodiments, such as those generally illustrate in FIG. 3, the first spring 48' may comprise a first prime spring compression and the second spring 50' may comprise a second prime spring compression. The first prime spring compression and comprise a value that is different from the second prime spring compression.

By way of non-limiting example, the actuator 24 may include one or more plate or disc stops 70. The stops 70 may be disposed on or about an interior surface of the body 30. A second plate 72 may be disposed on a lead screw 32 between plate 54 and a nut 36. In embodiments, the second plate 72 may be larger than plate 54. The second plate 72 may freely move along the lead screw 32. The first prime spring compression of the first spring 48' may act on the plate 54 while the second prime spring compression of the second spring 50' may act to hold the second plate 72 against the plate 54. In this way, the first prime spring compression and the second prime spring compression may be selected and/or configured to hold the plate 54 in a first position and to hold the second plate 72 in a second position.

As described, the actuator 24' may include the sensor 60. The sensor 60 may be configured to generate a voltage output value indicating a position of the plate 54. In embodiments, the sensor 62 may be configured to generate voltage values corresponding to a position of the second plate 72. The controller 46 may be configured to determine whether first spring 48' or the second spring 50' is compressed based on values received from the sensors 60 and 62. By way of non-limiting example, the controller 46 may receive a value from the sensor 60 and a value from the sensor 62. The controller 46 may compare the value received from the sensor 60 with the first voltage value. The controller 46 may compare the value received from the sensor 62 with the second voltage value.

The controller 46 may determine the first spring 48' is being compressed when the controller 46 determines the value received from the sensor 60 is different that the first voltage value and the value received from the sensor 62 is equal to the second voltage value. In embodiments, a value from the sensor 60 may indicate that the plate 54 may have moved while a value from the sensor 62 may indicate that the second plate 72 may not have moved. Conversely, the controller 46 may determine the second spring 50' may be being compressed when the controller 46 determines a value received from the sensor 60 is different than a first voltage value. The controller 46 may then determine a value received from the sensor 62 is different than a second voltage value. That is, a value from the sensor 60 indicates the plate 54 may have moved and a value from the sensor 62 indicates that the second plate 72 may have moved. The controller 46 may control the motor 40, such as described.

Figure 4:
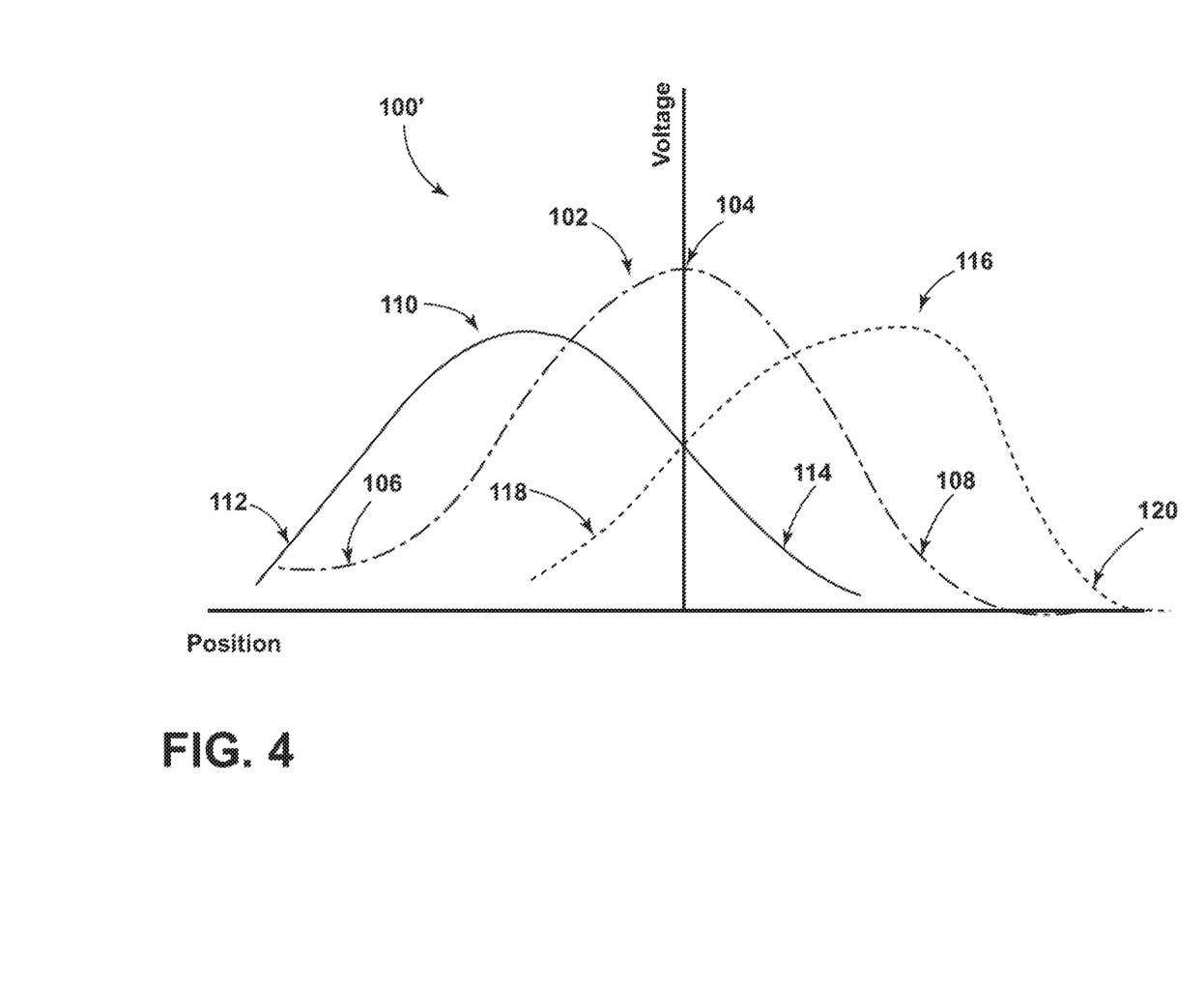
FIG. 4 generally depicts a data graph illustrating electrical load sensing data relative to a position of a component of an actuator.

With particular reference to FIG. 4, a graphical illustration 100 generally depicts voltage output values associated with a size of a gap between a plate 54 and a sensor 60 and/or 62. Graph line 102 generally depicts a graphical illustration of an embodiment employing a single sensor 60, such as described. A gap between the plate 54 and the sensor 60 may be smallest (i.e., an initial or a "zero gap" position) at 104. The gap between the plate 54 and the sensor 60 may be substantially larger at 106 and 108 (associated with a shift in either direction relative to position 104 on the central curve 102). The voltage value associated with a shift (e.g., at 106 or 108) may indicate the plate 54 has been displaced from an initial position. That is, a force applied to the actuator 24 may have suddenly increased and, consequently, the sensor 60 may decrease a voltage output accordingly.

Graph line 110 generally depicts a graphical illustration of voltage output values corresponding to a size of a gap between a plate 54 and a sensor 60. As is generally illustrated, the sensor 60 may be configured to output voltage values that are offset from a peak voltage value. That is, the sensor 60 may output a voltage value that is offset from the peak voltage value when the plate 54 is in an initial position. The value associated with 112 and 114 may indicate that the plate 54 may have been displaced form an initial position. That is, the sensor 60 may decrease voltage output in response to the plate 54 moving from an initial position. Graph line 116 generally depicts a graphical illustration of voltage output values corresponding to a size of a gap between the plate 54 (and/or the plate 72, as is described in other embodiments) and a sensor 62. Similar to line 110, line 116 may be offset from a peak voltage. Values associated with 118 and 120 may indicate that a gap between the plate 54 and the sensor 62 may have increased. Accordingly, the sensor 62 may decrease a voltage output.

With reference to FIG. 4, it is noted that in an embodiment with one sensor, the sensor could be positioned directly with or under a plate, which might provide a graph line or curve such as graph line 102. If two sensors are employed, neither sensor would be in the "center/middle," and both might be offset—e.g., an equal offset distance left and right of the center/middle. Such an embodiment might, for example, be generally represented by graph lines 110 and 116. An advantage associated with the use of two (or more) sensors is that direction may be sensed in addition to motion. However, it is important to note that the illustrated embodiments, including those of the graph lines or curves, are for purposes of illustration only and various other configurations may be utilized.

As described, in embodiments that employ more than one sensor, a controller 46 may be configured to determine whether one of a first spring 48 and a second spring 50 may be being compressed. A sensor 60 may be configured to output voltage values that are offset from a peak voltage. Accordingly, when the plate 54 is in an initial position, the sensor 60 communicates a value to a controller 46 indicating the plate 54 is in an initial position. However, the value may be substantially equal to a peak voltage value minus a predetermined value. As the plate 54 moves, the sensor 60 may communicate values indicating a change in a gap between the plate 54 and the sensor 60. Similarly, the sensor 62 may generate a voltage output signal that is offset from a peak voltage when the plate 54 is in an initial position. The sensor 62 may output a value that is substantially equal to a peak value minus a different offset value. That is, the sensors 60 and 62 generate differently offset voltage signals when the plate 54 is in an initial position.

Accordingly, a controller 46 may be configured to determine whether a first spring 48 or a second spring 50 may be being compressed based on a change in values from the sensors 60 and 62. As explained above, a gap between the plate 54 and the sensor 60 may be smaller than a gap between the plate 54 and the sensor 62 when a first spring 48 is compressed. Conversely, a gap between the plate 54 and the sensor 62 may be smaller than a gap between the plate 54 and the sensor 60 when a second spring 50 is compressed. The controller 46 may be configured to determine a first gap value associated with a gap between the plate 54 and the sensor 60. The controller 46 may be configured to determine a second gap value associated with a gap between the plate 54 and the sensor 62. The controller 46 may be configured to determine a first gap value based on a comparison between a voltage value received from the sensor 60 and a first voltage value. The controller 46 may be configured to determine a second gap value based on a comparison between a voltage value received from the sensor 62 and the second voltage value. The controller 46 may be configured to compare the first gap value and the second gap value. The controller 46 may determine a first spring 48 may be being compressed when the controller 46 determines the first gap value is smaller than the second gap value. Conversely, the controller 46 may determine a second spring 50 may be being compressed when the controller 46 determines the first gap value is larger than the second gap value.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed:

1. A device for monitoring a load or applied force, the device comprising:
   a body having a first end and a second end;
   a plate;
   a force-providing member comprising a rod and connected to the plate;
   a first biasing member in contact with a first side of the plate, the first biasing member disposed between a portion of the body at or about the first end and a portion of the plate;
   a second biasing member in contact with a second side of the plate opposite the first side, the second biasing member disposed between a portion of the plate and a portion of the body at or about the second end; and
   a first sensor configured to sense a displacement of the plate;
   wherein the body includes a portion configured to connect to or apply a force to another component, and wherein the first biasing member is configured to substantially retain the plate in an initial position during normal operation of the device.

2. The device of claim 1, wherein the device is configured to limit said load or applied force to or below a specified or pre-determined threshold.

3. The device of claim 1, wherein the first biasing member comprises a spring.

4. The device of claim 1, wherein the rod is a screw.

5. The device of claim 1, wherein the first biasing member and the second biasing member are configured to substantially retain the plate in the initial position during normal operation of the device.

6. The device of claim 1, wherein the first biasing member and the second biasing member provide substantially equal compressive forces.

7. A device for monitoring a load or applied force, the device comprising:
   a body having a first end and a second end;
   a plate;
   a force-providing member connected to the plate;
   a first biasing member, the first biasing member disposed between a portion of the body at or about the first end and a portion of the plate; and
   a first sensor configured to sense a displacement of the plate;
   wherein the body includes a portion configured to connect to or apply a force to another component, wherein the first biasing member is configured to substantially retain the plate in an initial position during normal operation of the device; and wherein the body includes a second plate, and one or more plate stops configured to restrict the movement of the second plate in an axial direction.

8. The device of claim 7, wherein the second plate is configured to move freely along or about the force-providing member.

9. The device of claim 7, wherein the first biasing member applies a force on the plate and a second biasing member biases the second plate against the plate.

10. The device of claim 9, wherein the first biasing member and the second biasing member are configured to hold the plate in a first position and to hold the second plate in a second position.

11. The device of claim 9, wherein the second plate is movable along a screw of the force-providing member.

12. The device of claim 9, wherein the first biasing member and the second biasing member have different compression forces.

13. A device for monitoring a load or applied force, the device comprising:
   a body having a first end and a second end;
   a plate;
   a force-providing member connected to the plate;
   a first biasing member, the first biasing member disposed between a portion of the body at or about the first end and a portion of the plate;
   a first sensor configured to sense a displacement of the plate; and
   including a controller in communication with the sensor;
   wherein the body includes a portion configured to connect to or apply a force to another component, and wherein the first biasing member is configured to substantially retain the plate in an initial position during normal operation of the device.

14. The device of claim 13, wherein the controller is configured to control the movement or position of the force-providing member.

15. The device of claim 14, wherein, upon a given input from the sensor, the movement of the force-providing member is modified or ended.

16. A device for monitoring a load or applied force, the device comprising:
   a body having a first end and a second end;
   a plate;
   a force-providing member connected to the plate;
   a first biasing member, the first biasing member disposed between a portion of the body at or about the first end and a portion of the plate;
   a first sensor configured to sense a displacement of the plate; and
   including a second sensor configured to sense a displacement in position of the plate;
   wherein the body includes a portion configured to connect to or apply a force to another component, and wherein the first biasing member is configured to substantially retain the plate in an initial position during normal operation of the device.

17. The device of claim 16, wherein a difference in an output associated with the sensor and an output associated with the second sensor provides a relative direction for movement of the plate.

18. The device of claim 17, wherein the output is a voltage signal.

19. A device for monitoring a load or applied force, the device comprising:
   a body having a first end and a second end;
   a plate;
   a force-providing member connected to the plate;
   a first biasing member, the first biasing member disposed between a portion of the body at or about the first end and a portion of the plate;
   a first sensor configured to sense a displacement of the plate;
   wherein the body includes a portion configured to connect to or apply a force to another component, wherein the first biasing member is configured to substantially retain the plate in an initial position during normal operation of the device; and wherein the plate comprises a magnetic portion or includes one or more magnets.

20. The device of claim 19, wherein the sensor is configured to vary a value of a voltage output in response to a magnetic field generated by the plate.

21. The device of claim 20, wherein the magnetic field changes as a gap or distance between the plate and the sensor changes.

* * * * *